United States Patent
West

(10) Patent No.: US 8,984,831 B1
(45) Date of Patent: Mar. 24, 2015

(54) MONOLITHIC CONCRETE POUR FOR SAFE ROOM

(71) Applicant: Wendell West, Tulsa, OK (US)

(72) Inventor: Wendell West, Tulsa, OK (US)

(*) Notice: Subject to any disclaimer, the term of this patent is extended or adjusted under 35 U.S.C. 154(b) by 0 days.

(21) Appl. No.: 14/174,079

(22) Filed: Feb. 6, 2014

(51) Int. Cl.
   E04B 1/18 (2006.01)
   E04B 1/16 (2006.01)
   E04H 9/00 (2006.01)

(52) U.S. Cl.
   CPC . *E04B 1/167* (2013.01); *E04H 9/00* (2013.01)
   USPC .......................................... 52/414; 52/236.6

(58) Field of Classification Search
   USPC ................................ 52/414, 236.6, 289, 80.1
   See application file for complete search history.

(56) References Cited

U.S. PATENT DOCUMENTS

| | | | | |
|---|---|---|---|---|
| 681,503 A | * | 8/1901 | Hoff | 138/176 |
| 1,496,862 A | * | 6/1924 | Olmsted | 52/289 |
| 1,909,417 A | * | 5/1933 | Nieman | 52/408 |
| 1,971,331 A | * | 8/1934 | Cavaglieri | 52/414 |
| 3,568,388 A | * | 3/1971 | Flachbarth | 52/588.1 |
| 4,333,280 A | * | 6/1982 | Morton | 52/167.1 |
| 4,486,993 A | * | 12/1984 | Graham et al. | 52/262 |
| 4,488,385 A | * | 12/1984 | Teasel et al. | 52/92.2 |
| 5,048,257 A | * | 9/1991 | Luedtke | 52/747.1 |
| 5,809,724 A | * | 9/1998 | Bodnar | 52/414 |
| 6,578,343 B1 | * | 6/2003 | Dumler et al. | 52/783.17 |
| 7,237,362 B2 | * | 7/2007 | Bishop | 52/79.2 |
| 7,562,500 B2 | * | 7/2009 | Siu | 52/236.6 |
| 8,091,316 B2 | * | 1/2012 | Beck et al. | 52/650.1 |

* cited by examiner

Primary Examiner — Basil Katcheves
(74) Attorney, Agent, or Firm — Molly D. McKay

(57) ABSTRACT

A framework and method of forming a single pour concrete form for walls and ceiling of a safe room. The walls secure to a concrete slab with concrete anchors. C-channel ceiling joists attach on top of vertical metal wall studs to which plywood is secured on each side to define walls forms. A metal web blocking piece attaches between adjacent ceiling joists and is spaced apart from the ends of the ceiling joist to form concrete flow channels between the ceiling and walls. A plywood strip seals between the metal web blocking pieces and the plywood on the interior walls to funnels concrete into the wall forms. Corrugated metal decking is secured to the top of the ceiling joists creating a ceiling form that does not extend to the plywood on the exterior walls, thus providing access openings for cement to flow from the ceiling form into the wall forms.

9 Claims, 6 Drawing Sheets

MONOLITHIC CONCRETE POUR FOR SAFE ROOM

BACKGROUND OF THE INVENTION

1. Field of the Invention

The present invention is a framework and a method for using that framework to enable a monolithic concrete pour of a safe room or other concrete structure where it is desirable to pour concrete for both the walls and ceiling of the structure simultaneously.

2. Description of the Related Art

It is becoming increasing popular to install safe rooms in or near existing buildings, such as homes, schools, businesses, etc. These safe rooms are useful in protecting the occupants from tornados, and other dangers such as armed intruders. Safe rooms can be separated into two different types of construction: metal and concrete.

Generally metal safe rooms are prefabricated structures that are transported to the installation location and installed onto an existing concrete slab with suitable concrete anchor bolts, such as those manufactured by Hilti. There are a few metal safe rooms that are constructed on site by using fasteners to secure together large metal panels. Whether the metal safe room is prefabricated or is constructed in place, all metal safe rooms have one significant drawback. That drawback is that the structures cannot be installed inside most existing buildings because the prefabricated safe room or the panels from which the safe room is to be constructed is too large to enter the building without cutting an opening in the building.

Concrete safe rooms on the other hand can be constructed in place, provided the building into which the safe room is to be installed has or can be made to have a concrete floor that is sufficient to serve as an adequate anchor for the safe room which will be anchored to the existing floor or newly created pad for the safe room. Obviously, if the existing concrete floor is insufficient as a base for the safe room, a section of the existing floor can be removed and a sufficient concrete base can be constructed before the safe room is constructed.

Once a location for the safe room with a sufficient concrete base has been secured, then the concrete safe room can be built. Currently, this is done in two steps: first the walls are constructed for the safe room and then the ceiling is constructed of the safe room.

First, the walls of the safe room are constructed. To construct the walls of the safe room, anchors are secured into the existing base around where the walls of the safe room are to be located. Then forms for the walls are constructed of wood or other suitable material. Normally, the forms include either an opening into which a metal door frame and door will later be installed or a metal door frame that is secured in the forms so that when the walls are poured, the door frame is secured to the walls. The concrete walls are then poured. While the concrete is still soft, anchors are installed in the tops of the walls so that the anchors extend out the tops of the walls. These anchors will be used to later secure the ceiling to the walls when the concrete ceiling is poured. The poured concrete walls are then allowed to cure. The forms may either be removed after the walls are cured, or alternately, may be left in place while the ceiling is constructed.

Second, the ceiling of the safe room is constructed. To construct the ceiling, concrete forms for pouring the ceiling are built on top of the poured concrete walls such that the anchors that were installed in the walls during the pouring of the walls extend into the concrete form for the ceiling as a means of securing the poured ceiling to the previously poured walls. Once the ceiling forms are ready, the concrete ceiling is poured and the concrete ceiling is allowed to cure. The forms may either be removed after the ceiling is cured, or alternately, may be left in place.

When building a concrete safe room, a major cost involved in the construction is the labor needed to build two different forms and to do two pours of concrete, i.e. one for the walls and one for the ceiling. If a single form could be constructed and used to simultaneously pour the walls and the ceiling of a safe room, a concrete safe room could be constructed more quickly and at less cost.

The present invention addresses this need by providing a metal framework that forms a concrete form for both the walls and ceiling of a safe room so that a monolithic safe room can be created on a suitable base from a single concrete pour which simultaneously creates both the walls and ceiling of the safe room.

SUMMARY OF THE INVENTION

The present invention is a metal and plywood framework that forms a concrete form for both the walls and ceiling of a safe room so that a monolithic safe room can be created on a suitable concrete base from a single concrete pour which simultaneously creates both the walls and ceiling of the safe room and the method for creating a monolithic safe room employing the framework.

As the framework is constructed, appropriate concrete bolts are installed in the concrete base where the walls of the safe room will be located as a means of securing the safe room to the previously poured concrete base when concrete for the safe room is poured.

The framework consists of c-channel ceiling joists that secure on top of vertical metal studs. Plywood skin is secured to either side of the studs to form the walls of the form. A metal web blocking piece is attached between each set of adjacent ceiling joists and spaced apart from the ends of the ceiling joist on the two opposite ends of the ceiling joists, forming a channel at the junction of the ceiling and the walls. Each of the metal web blocking pieces is created from c-channel that has had notches cut out of a first one of its ends. The notches are to receive the lips of the c-channel ceiling joists. Upper and lower tabs of the c-channel remain intact adjacent to the notches as a means of securing the first end of the metal web blocking piece to the ceiling joists. An opposite second end of the c-channel of the metal web blocking piece is clipped on top and bottom so that the c-channel can be bent backward at a right angle to form a lip with upper and lower tabs. The tabs are used for securing the second end of the metal web blocking piece to the ceiling joists.

A plywood strip seals between the metal web blocking pieces and the plywood skin that is secured to the inside of the studs, thereby funneling concrete that enters the channel into the top of the wall forms.

The sides of the safe room that are parallel with the ceiling joists will not need to employ metal web blocking pieces as the two outermost ceiling joists of the safe room on each of these two sides will be located, respectively, directly above the interior plywood skin of the wall and directly above the exterior plywood skin of the wall of those two walls so that a channel will be formed between the two outermost ceiling joists and the plywood skin of those walls.

Corrugated metal decking is secured to the top of the ceiling joists to create a ceiling form above the decking into which concrete will be poured to form the ceiling of the safe room. The outer walls of the ceiling form are provided by the plywood skin that secures to outer sides of the wall form and extend upward above the c-channel ceiling joists. The corrugated metal decking does not extend to this outer plywood skin of the wall form so as to provide an access opening in the bottom of the ceiling form between the corrugated metal decking and the outer plywood skin of the wall form. This access opening allows concrete that is poured into the ceiling form to flow through the access opening into the channel and then into the wall forms on all fours sides of the ceiling form.

Rebar is provided on approximately 24 inch centers going horizontally and vertically within the walls forms and the rebar continues uninterrupted into the ceiling form.

Once the framework has thus been prepared, concrete is poured into the open top of the ceiling form and flows through the access openings on all four sides of the ceiling form into the wall forms. As the concrete is poured, the wall forms preferably will be vibrated to eliminate all air pockets within the wall forms. When the wall forms and the ceiling form are completely filled, the concrete is allowed to cure and the safe room is completed.

DETAILED DESCRIPTION OF THE PREFERRED EMBODIMENT

Figure 1:
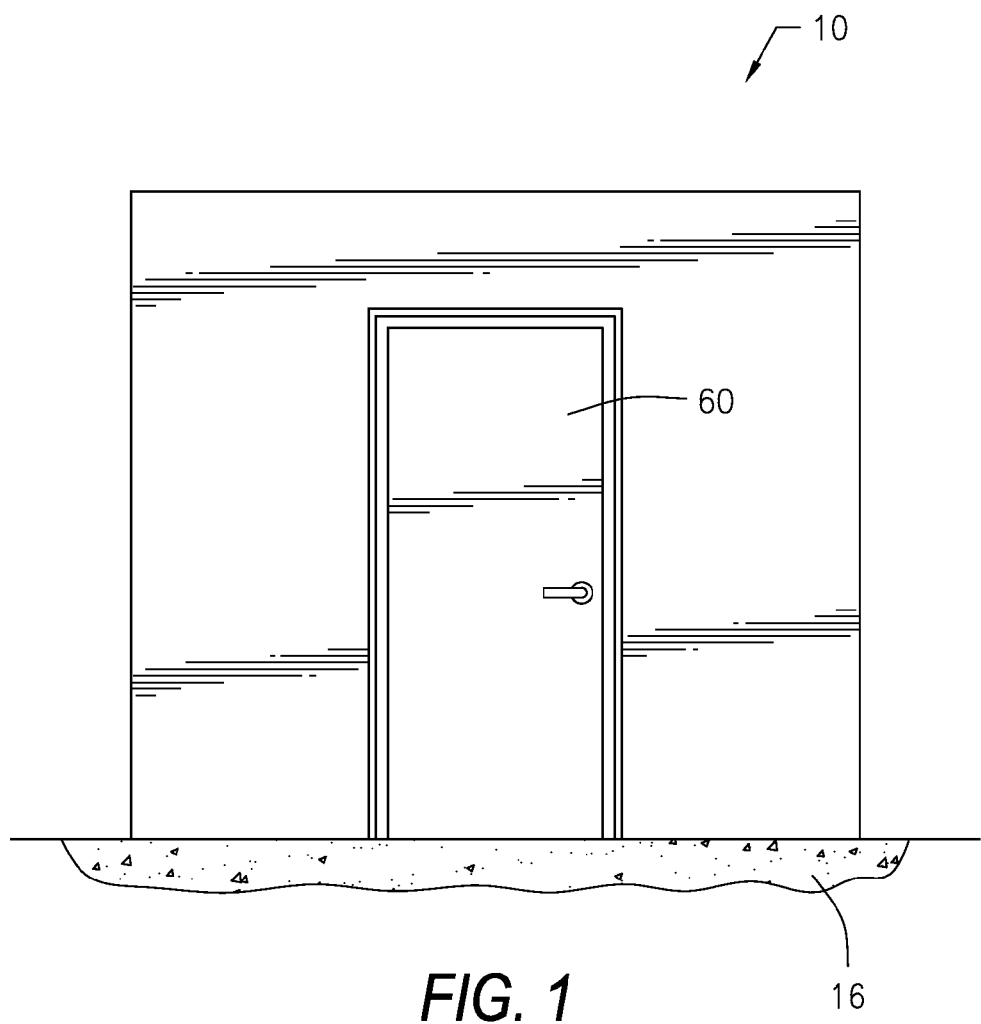
FIG. 1 is front plan drawing of a safe room that is constructed of a monolithic concrete pour in accordance with a preferred embodiment of the present invention.
Figure 2:
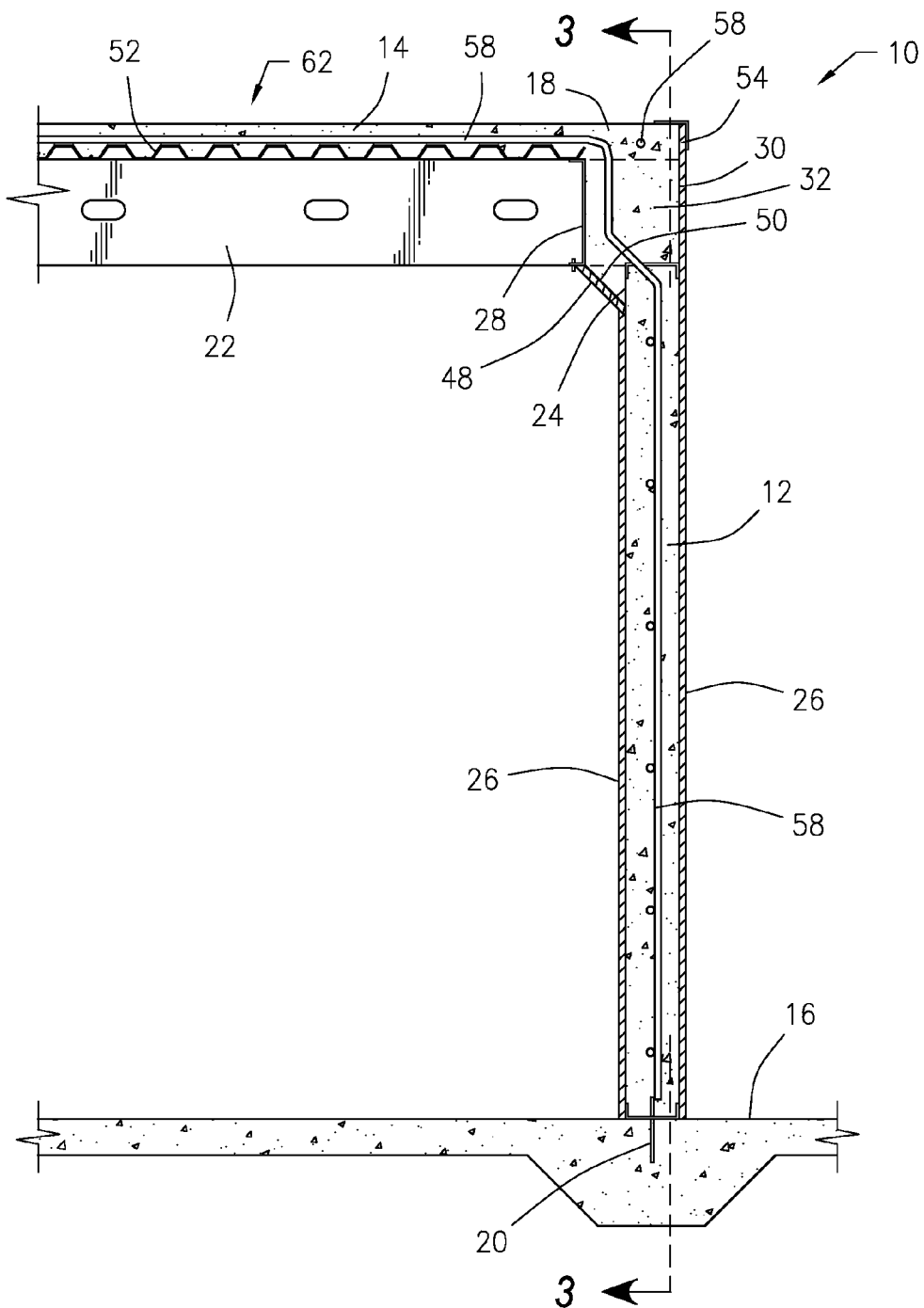
FIG. 2 is a cross sectional view of a wall and ceiling of the safe room of FIG. 1 showing the internal structure of the safe room and its attachment to a concrete slab floor.

Referring now to FIG. 1, there is illustrated a safe room 10 that is constructed as a monolithic concrete pour in accordance with a preferred embodiment of the present invention. As shown in FIG. 2, the invention is a metal and plywood framework that forms a unitary concrete form for a safe room 10 so that a monolithic safe room 10 can be created on a suitable concrete base 16 from a single concrete pour. The single concrete pour simultaneously creates both walls 12 and ceiling 14 of the safe room 10. The invention also includes the method for creating a monolithic safe room 10 employing this framework.

Hereafter the wall or walls 12 will also be referred to as the wall form or wall forms 12 as it should be understood that the wall forms 12 will become the walls 12 once concrete 18 has been poured within the wall forms 12. Also, hereafter the ceiling 14 will also be referred to as the ceiling form 14 as it should be understood that the ceiling form 14 will become the ceiling 14 once concrete 18 has been poured within the ceiling form 14.

Figure 3:
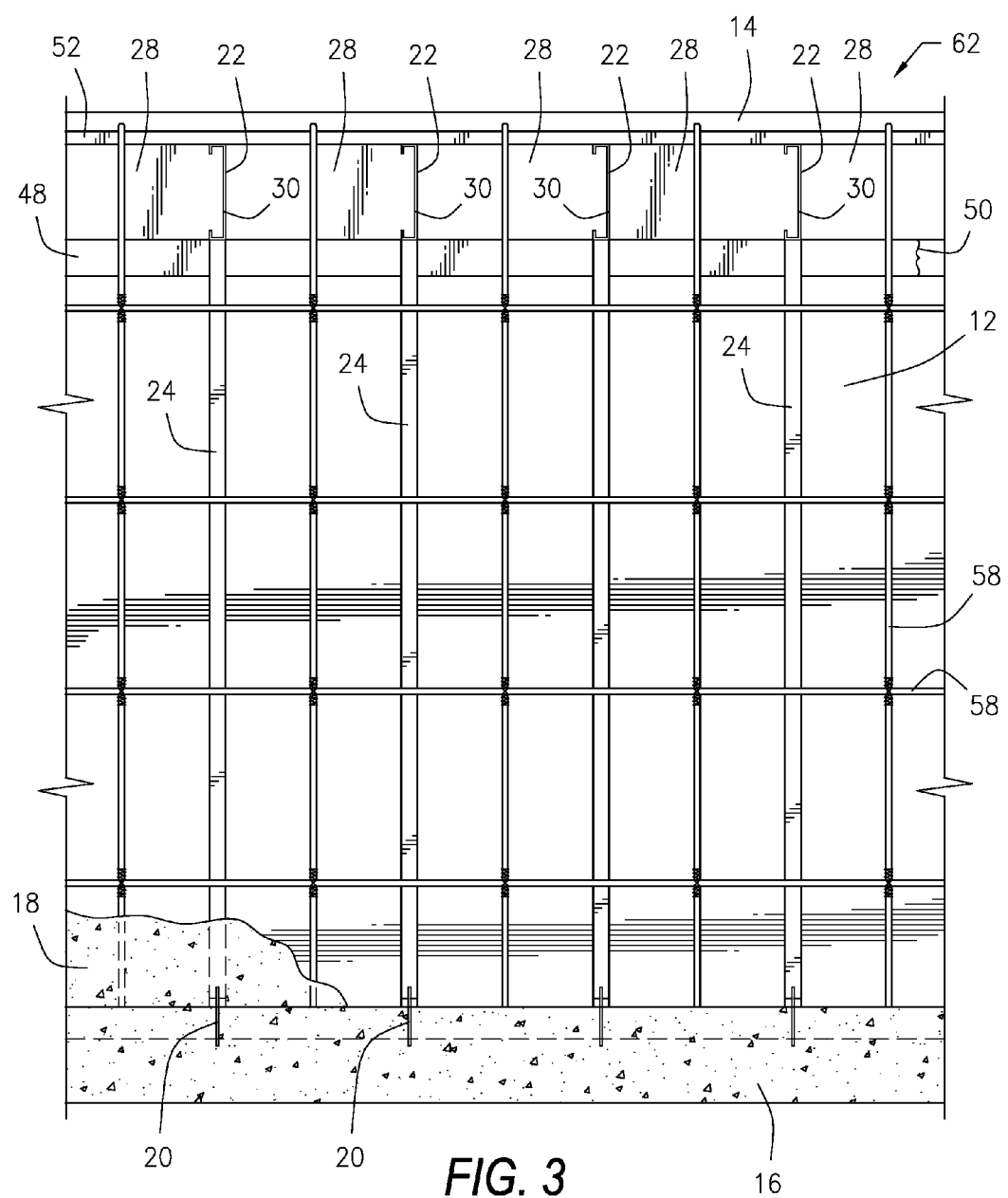
FIG. 3 is a partially cut away view of the wall and ceiling taken along line 3-3 of FIG. 2.

Referring to FIGS. 2 and 3, as the framework is constructed, concrete bolts or anchors 20 are installed in the concrete base 16 where the walls 12 of the safe room 10 will be located. The concrete bolts 20 will secure the safe room 10 to the previously poured concrete base 16 when concrete 18 for the walls 12 and ceiling 14 of the safe room 10 is poured.

Figure 4:
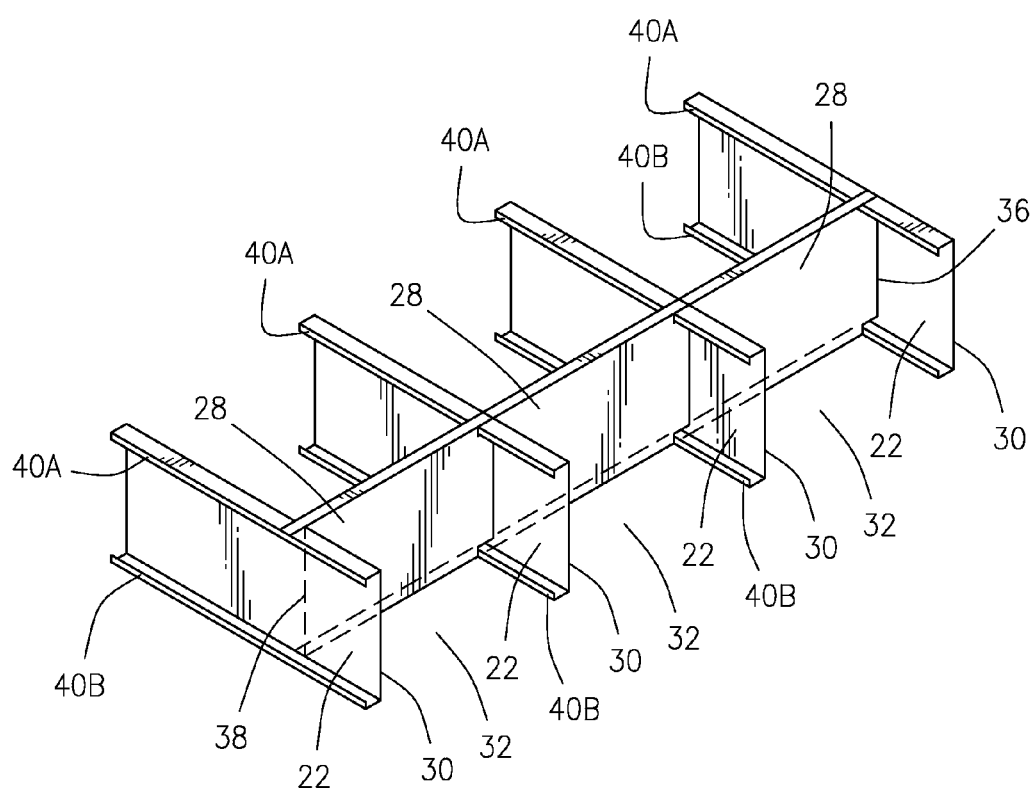
FIG. 4 is an enlarged view of the internal structure at the intersection of the ceiling and wall of the safe room of FIG. 1.
Figure 5:
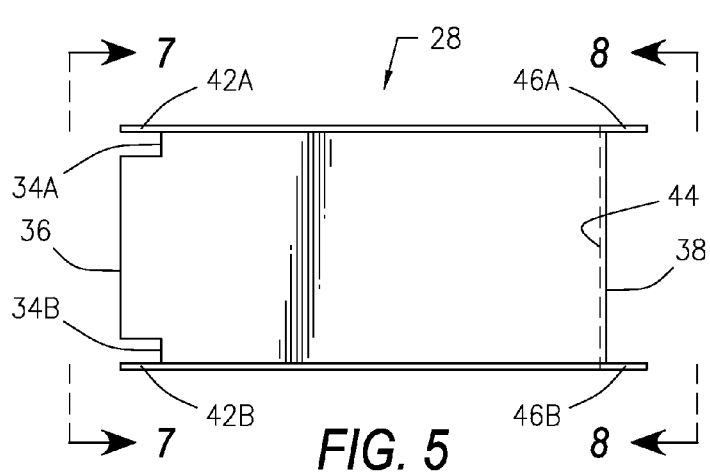
FIG. 5 is a rear view of a metal web blocking piece employed at the intersection of the ceiling and wall of the safe room of FIG. 1.
Figure 8:
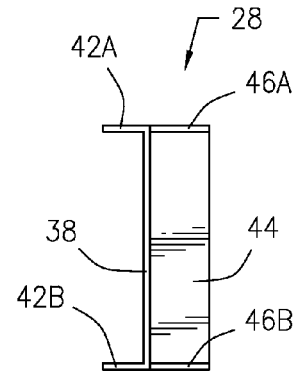
FIG. 8 is an opposite end view of the metal web blocking piece taken along line 8-8 of FIG. 5.
Figure 6:
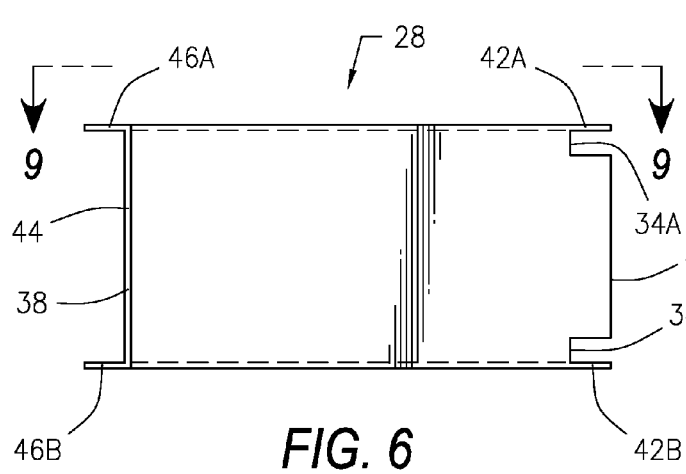
FIG. 6 is a front view of the metal web blocking piece of FIG. 5.
Figure 7:
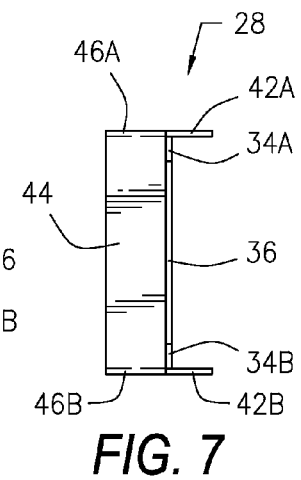
FIG. 7 is an end view of the metal web blocking piece taken along line 7-7 of FIG. 5.
Figure 9:
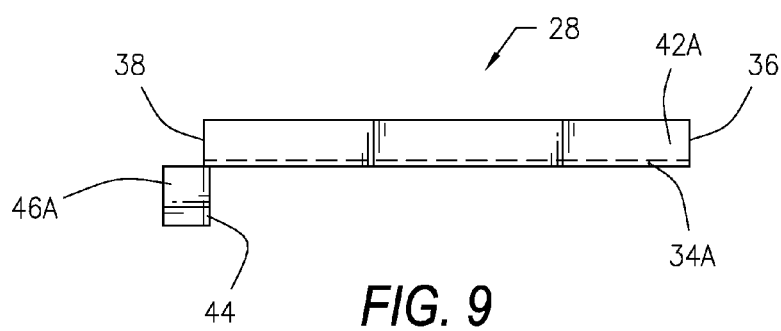
FIG. 9 is a top plan view of the metal web blocking piece taken along line 9-9 of FIG. 6.

Referring to FIGS. 2 and 4, the framework consists of c-channel ceiling joists 22 that secure on top of vertical metal wall studs 24 which serve as the studs 24 for the walls 12 of the safe room 10. Plywood skin 26 is secured to either side of the studs 24 to create the wall form 12. Metal web blocking pieces 28 are attached between adjacent ceiling joists 22 and spaced apart from the ends 30 of the ceiling joists 22 on the two opposite ends 30 of the ceiling joists 22, forming end channels 32 at the junction of the ceiling 14 and the walls 12 through which concrete 18 will flow from on top of the ceiling form 14 and into the wall forms 12 on the two oppose ends 30 of the ceiling joists 22.

Referring to FIGS. 4-9, each metal web blocking piece 28 is created from c-channel that has had notches 34A and 34B cut out of a first end 36 of its two opposite ends 36 and 38. The notches 34A and 34B are to receive lips 40A and 40B of the c-channel ceiling joists 22. Upper and lower tabs 42A and 42B of the first end 36 c-channel remain intact adjacent to the notches 34A and 34B as a means of securing the first end 36 of the metal web blocking piece 28 to the ceiling joists 22.

The second end 38 of the c-channel of the metal web blocking piece 28 is clipped on top and bottom so that the c-channel can be bent backward at a right angle to form a forward extending lip 44 having upper and lower tabs 46A and 46B. The tabs 46A and 46B are used for securing the second end 38 of the metal web blocking piece 28 to the ceiling joists 22.

Figure 10:
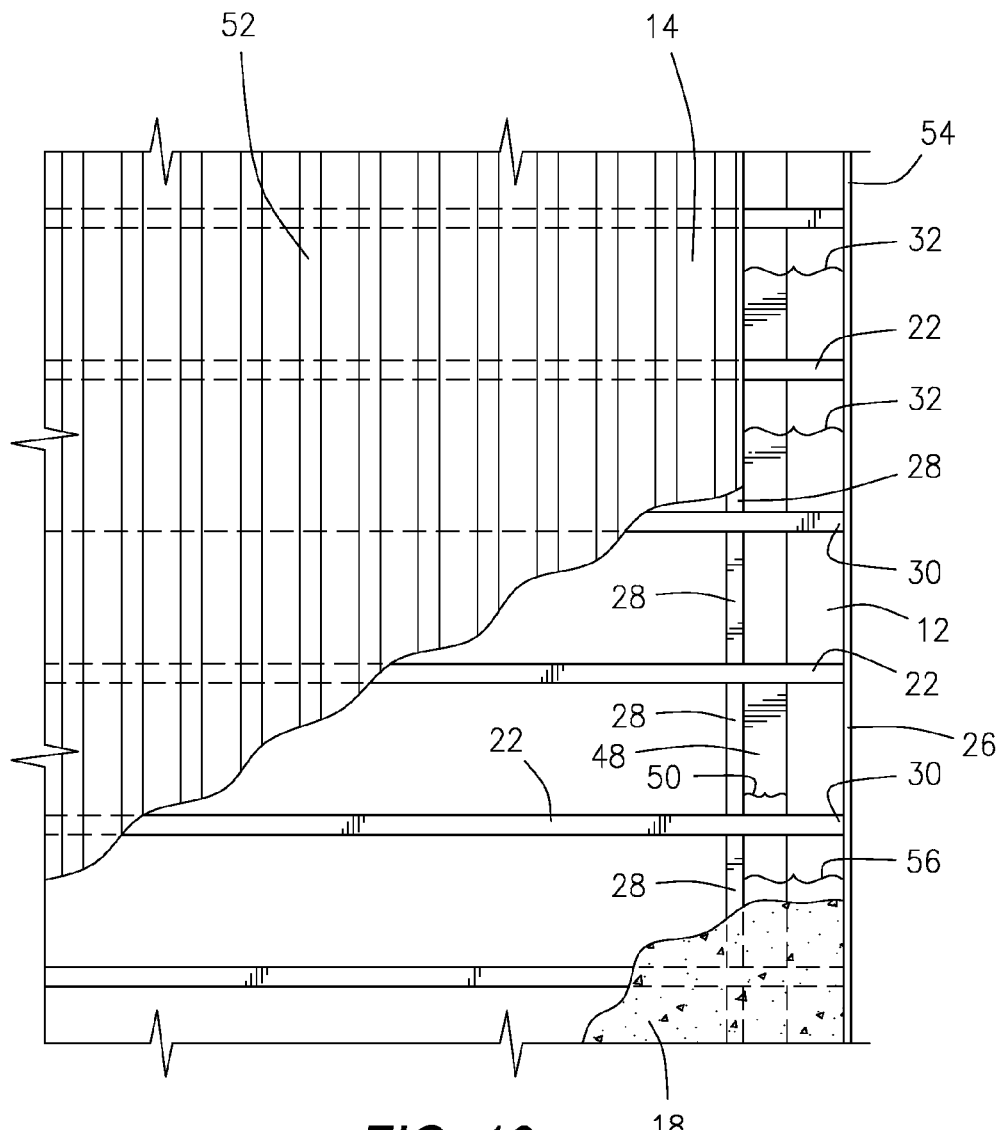
FIG. 10 is a partially cut away top plan view of the ceiling of the safe room of FIG. 1.

As shown in FIGS. 2, 3 and 10, a plywood strip 48 seals between the metal web blocking pieces 28 and the plywood skin 26 that is secured to the inside of the wall studs 24, thereby creating an inclined slope 50 between the ceiling form 14 and the two wall forms 12 located at the two ends 22 of the ceiling joists 22. The inclined slope 50 funnels concrete 18 that enters the ceiling form 14 into the end channels 32 and from there into the tops of the two wall forms 12 located at the two ends 22 of the ceiling joists 22.

The two walls 12 of the safe room 10 that are parallel with the ceiling joists 22 will not need to employ metal web blocking pieces 28 as the two outermost ceiling joists 22 of the safe room 10 on each of these two walls 12 will be located, respectively, directly above the interior plywood skin 26 of the wall form 12 and directly above the exterior plywood skin 26 of the wall forms 12 of each of those two walls 12 so that side channels (not illustrated) will be created between the two outermost ceiling joists 22 and the plywood skin 26 for each of those two walls forms 12.

As shown in FIGS. 2 and 10, corrugated metal decking 52 is secured to the top side of the ceiling joists 22 to create a ceiling form 14 above the decking 52 into which concrete 18 will be poured to create the ceiling 14 of the safe room 10. The outer walls 54 of the ceiling form 14 are provided by the plywood skin 26 that secures to outer sides of each of the walls 12 and extends upward above the c-channel ceiling joists 22. The corrugated metal decking 52 does not extend to this outer plywood skin 26 of the wall forms 12 so as to provide access openings 56 in the bottom of the ceiling form 14 between the corrugated metal decking 52 and the outer plywood skin 26 of the wall forms 12. These access openings allows concrete 18 that is poured into the ceiling form 14 to flow through the access openings into the end channels 32 and the side channels 33 and then into the wall forms 12 on all fours sides of the ceiling form 14.

As illustrated in FIGS. 2 and 3, reinforcing bars or rebar 58 is provided on approximately 24 inch centers going horizontally and vertically within the walls forms 12 with each intersection of rebar 58 being tied together. The rebar 58 continues uninterrupted into the ceiling form 14.

Referring once again to FIG. 1, an appropriate door 60 may be secured into a door opening provided in the wall forms 12 either before or after the concrete 18 is poured to provide a means of accessing a hollow interior within the safe room 10. The door 60 may or may not be provided with ventilation openings therein to provide ventilation to the interior of the safe room 10 once the safe room 10 is fully constructed.

Once the framework has thus been prepared, concrete 18 is poured into the open top 62 of the ceiling form 14 and flows through the access openings 56 on all four sides of the ceiling form 14 into the all of the wall forms 12. As the concrete 18 is poured, the wall forms 12 preferably will be vibrated to eliminate all air pockets that may form within the wall forms 12. When the wall forms 12 and the ceiling form 14 are completely filled, the concrete 18 is the allowed to cure and the safe room 10 is completed.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A concrete form for creating a safe room by monolithic concrete pour comprising:
    c-channel ceiling joists secure on to of vertical wall studs,
    a skin secured to either side of the wall studs to form wall forms,
    corrugated metal decking secured to the top of the ceiling joists to create an open top ceiling form above the decking into which concrete will be poured,
    a web blocking piece attached between adjacent ceiling joists and spaced apart from the ends of the ceiling joists on opposite ends of the ceiling joists to form channels between the ceiling form and the wall forms through which concrete will flow from the ceiling form into the wall forms,
    a c-channel cut to length to secure between adjacent c-channel ceiling joists,
    a first end of the c-channel having notches cut out for receiving lips of one of the c-channel ceiling joists, upper and lower tabs adjacent to the notches for securing the first end to one of the c-channel ceiling joists, and
    an opposite second end of the c-channel clipped on top and bottom so that the c-channel is bent backward at a right angle to form a lip with upper and lower tabs for securing the second end to one of the c-channel ceiling joists.

2. A concrete form for creating a safe room by monolithic concrete pour according to claim 1 further comprising:
    the skin provided on the outer walls of the wall forms extending upward beyond the c-channel ceiling joists to form outer walls of the ceiling form.

3. A concrete form for creating a safe room by monolithic concrete pour according to claim 2 wherein the corrugated metal decking does not extend to the skin provided on the outer walls of the wall forms so as to provide access openings between the ceiling form and the wall forms.

4. A concrete form for creating a safe room by monolithic concrete pour according to claim 1 further comprising:
    rebar secured within the wall forms and the ceiling form.

5. A concrete form for creating a safe room by monolithic concrete pour according to claim 1 further comprising:
    concrete filling the wall forms and the ceiling form.

6. A concrete form for creating a safe room by monolithic concrete pour according to claim 1 wherein the skin is constructed of plywood.

7. A concrete form for creating a safe room by monolithic concrete pour according to claim 1 further comprising:
    a strip attached between the metal web blocking pieces and the skin that is secured to the inside of the studs to funnel concrete that enters the channel into the top of the wall forms.

8. A concrete form for creating a safe room by monolithic concrete pour according to claim 7 further comprising:
    each wall form that is parallel with the ceiling joists being provided with two outermost ceiling joists that are secured above the interior and exterior skins of the walls forming channels between the two ceiling joists and the skins of those walls forms.

9. A concrete form for creating a safe room by monolithic concrete pour according to claim 1 further comprising:
    concrete anchors securing the wall forms to a concrete base.

* * * * *